(12) United States Patent
Bradbury

(10) Patent No.: US 10,578,398 B1
(45) Date of Patent: Mar. 3, 2020

(54) DRONE DEPLOYMENT APPARATUS FOR ACCOMMODATING AIRCRAFT FUSELAGES

(71) Applicant: Michael Sean Bradbury, Eagle, CO (US)

(72) Inventor: Michael Sean Bradbury, Eagle, CO (US)

(73) Assignee: Michael S. Bradbury, Eagle, CO (US)

( * ) Notice: Subject to any disclaimer, the term of this patent is extended or adjusted under 35 U.S.C. 154(b) by 0 days.

(21) Appl. No.: 16/166,835

(22) Filed: Oct. 22, 2018

(51) Int. Cl.
*F41F 3/065* (2006.01)
*B64D 7/08* (2006.01)
*B64C 39/02* (2006.01)

(52) U.S. Cl.
CPC ............ *F41F 3/065* (2013.01); *B64C 39/024* (2013.01); *B64D 7/08* (2013.01); *B64C 2201/046* (2013.01); *B64C 2201/082* (2013.01); *B64C 2201/167* (2013.01); *B64C 2201/206* (2013.01)

(58) Field of Classification Search
CPC .. B64C 39/024; B64C 2201/082; F41F 3/065; F41F 3/06; B64D 7/08
See application file for complete search history.

(56) References Cited

U.S. PATENT DOCUMENTS

| | | | | |
|---|---|---|---|---|
| 1,636,451 A * | 7/1927 | Andrus | ..................... | B64D 7/08 89/1.41 |
| 2,820,397 A * | 1/1958 | Durkin | ..................... | B64D 7/08 89/1.51 |
| 2,938,434 A * | 5/1960 | Myron | ..................... | B64D 7/02 89/1.815 |
| 3,269,268 A * | 8/1966 | Gould | ..................... | F41F 3/065 89/1.813 |
| 4,211,169 A * | 7/1980 | Brothers | ................. | F42B 10/08 102/494 |
| 4,307,650 A * | 12/1981 | Kuesters | ................... | F41F 3/06 89/1.56 |
| 4,409,880 A * | 10/1983 | Fetterly | ..................... | F41F 3/06 244/137.1 |
| 6,056,237 A * | 5/2000 | Woodland | ................. | B64C 3/40 244/3.15 |
| 7,467,762 B1 | 12/2008 | Parsons | | |
| 7,845,283 B2 | 12/2010 | Finneral | | |
| 8,439,301 B1 | 5/2013 | Lussier | | |
| 8,536,500 B2 * | 9/2013 | Glasson | ................. | F41A 27/22 244/3.1 |
| 9,086,251 B2 | 7/2015 | Cummings | | |
| 9,470,477 B2 * | 10/2016 | Su | ......................... | B64C 39/024 |
| 9,773,419 B1 | 9/2017 | Gordon et al. | | |
| 9,863,739 B2 * | 1/2018 | Hester, Jr. | ................. | F41F 5/00 |
| 2008/0111021 A1 | 5/2008 | Toth | | |
| 2009/0007765 A1 | 1/2009 | Hunn | | |

(Continued)

FOREIGN PATENT DOCUMENTS

| EP | 0078858 A1 * | 5/1983 | .............. | B64D 7/08 |
|---|---|---|---|---|
| EP | 3 112 255 | 1/2017 | | |

*Primary Examiner* — Joshua T Semick

(57) ABSTRACT

The present invention is capable of containing, transporting, and deploying a plurality of kinetic energy impact drones capable of aerial navigation and swarm formations. The apparatus has a circular profile to accommodate fitting within the inherently circular profile of an Unmanned Aerial Vehicles (UAV) fuselage as well as to allow high rate of drone deployment.

3 Claims, 6 Drawing Sheets

(56) References Cited

U.S. PATENT DOCUMENTS

| | | | |
|---|---|---|---|
| 2012/0055321 A1* | 3/2012 | Angeloff | F41F 3/065 89/1.51 |
| 2015/0329205 A1 | 11/2015 | Hanna et al. | |
| 2017/0057635 A1 | 3/2017 | Strayer | |
| 2017/0106986 A1 | 4/2017 | Sweeny | |
| 2017/0111228 A1 | 4/2017 | Obaidi | |
| 2017/0113815 A1 | 4/2017 | James | |
| 2017/0117676 A1 | 4/2017 | James | |
| 2017/0154536 A1 | 6/2017 | Kreiner | |
| 2017/0343645 A1* | 11/2017 | Kim | B64C 30/00 |

* cited by examiner

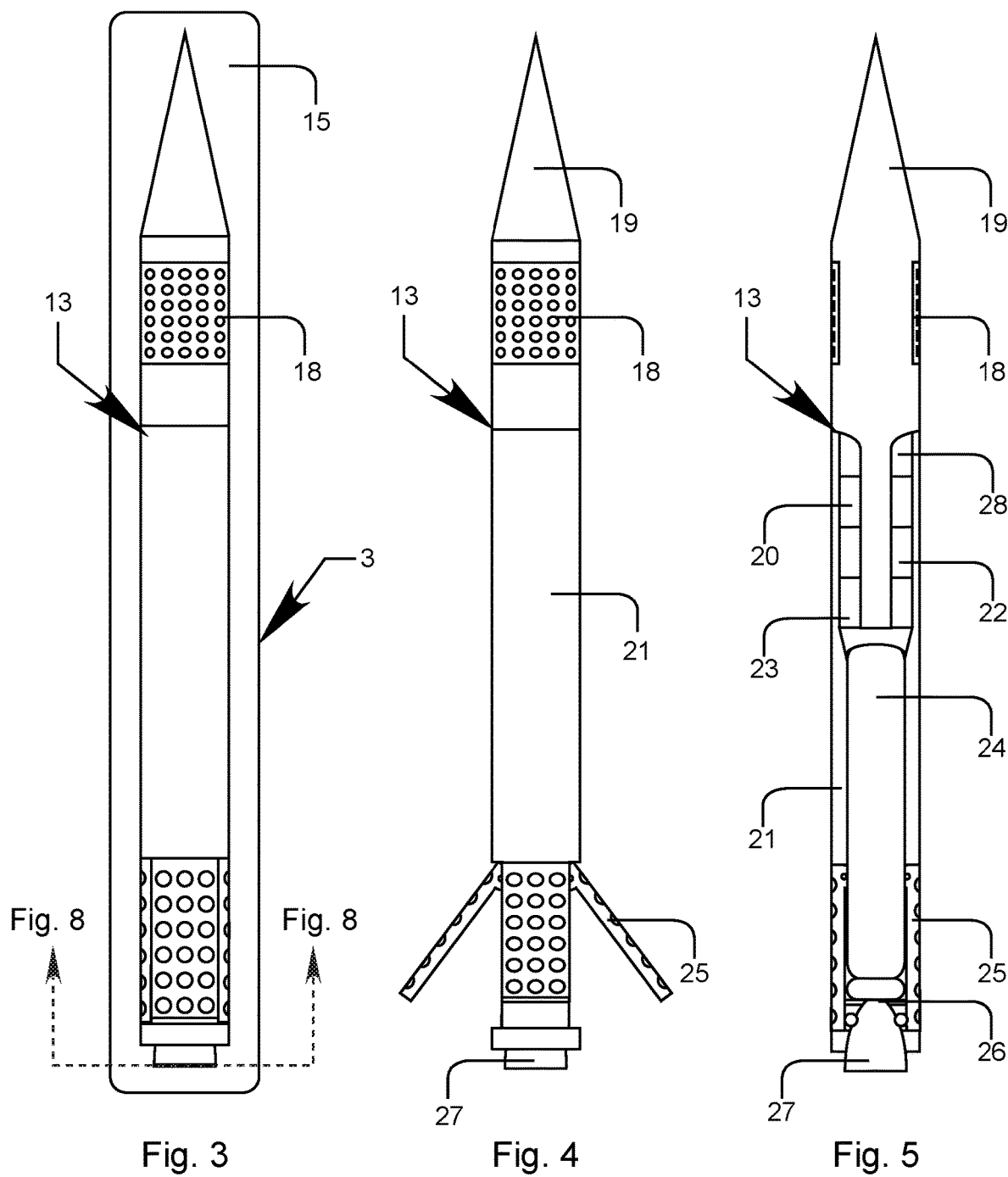

DRONE DEPLOYMENT APPARATUS FOR ACCOMMODATING AIRCRAFT FUSELAGES

CROSS-REFERENCE TO RELATED APPLICATION

This application claims priority to U.S. Provisional Application No. 62/576,076 filed on Oct. 23, 2017.

FEDERALLY SPONSORED RESEARCH

Not Applicable

SEQUENCE LISTING OR PROGRAM

Not Applicable

PRIOR-ART

Patent EP 3 112 255 issued to Boeing in 2017 for the Stowage Carousel and Method of Storing Cargo for use with an Aircraft. The invention is innovative in the respects of allowing for radial configuration for cargo storage, but the invention does not allow for multiple cargo units stacked towards the central axis of the aircraft nor does it allow for the cargo to be deployed via ejection mechanism from the aircraft.

U.S. Pat. No. 6,056,237 to Richard Woodland for a Sonotube Compatible Unmanned Aerial Vehicle and System defines an unmanned aerial vehicle apparatus. The invention is for a single drone unit deployable from a mobile potable apparatus to deploy a single airborne vehicle for reconnaissance or supply support missions.

U.S. Pat. No. 7,467,762 issued to Parsons in 2008 for the Advanced Unmanned Aerial Vehicle System defines a shoulder-launched rocket and parafoil hybrid to quickly position a payload at altitude and defeat adverse winds. The parafoils allow for a controlled descent to position the payload onto the target area thus defining a gravity fed parafoil controlled descending and not capable of becoming a defense mechanism against supersonic vehicles.

U.S. Pat. No. 7,845,283 was awarded to Finneral et al. in 2010 for the Controlled Dispense System for Deployment of Components into Desired Pattern and Orientation. The invention here is a "dispensing concept for unattended components . . . that utilizes a multi-staged release approach to achieve a desired ground pattern. P. 7 Col. 2 21-26. The invention allows for radial deployment of its cargo but does not incorporate a superposed tubed mechanism for maximum volume utilization and ease of deployment and thus severely restricts the number of components it can deploy per delivery vehicle.

U.S. Pat. No. 8,439,301 issued in 2013 to Lussier et al. for the Systems and Methods for Deployment and Operation of Unmanned Aerial Vehicle. The invention details a "UAV deployment and operation system capable of reliable remote, unattended operation" P 8, Col. 2 6-8. " . . . a standalone tower, or trailer containing a tower, can support UAV storage, launch and recovery equipment" P 8, Col. 2 8-10. The deployment capability of the invention is for an array of singularly charged aerial vehicles in a ground based tower-mounted system and cannot be adapted for airborne vehicular applications.

U.S. Pat. No. 9,086,251 issued to Cummings in 2015 for an Indexing Pneumatic Launcher for Multiple Toy Rocket Projectiles. The invention here is for "A toy launching assembly for pneumatically launching toy projectiles" and "A tube carousel rotates atop the base structure. The tube carousel holds a plurality of launching tubes. A pulse of air is generated by rapidly compressing an air bladder." Pg. 1, Col. 2, Abstract. The launcher in this invention allows for linear launching of the projectiles and not for a radially launched capability.

Patent Application No. US 2008/0111021 was issued to Toth in 2008 for the Deployment System and Method for Subsurface Launched Unmanned Aerial Vehicle. The invention here is defined as "A launch system is provided in which an unmanned aerial vehicle is secured to a platform in a watertight tube adapted to be launched from a submerged platform." Col 2, Abstract. The invention here is for a submersible launch platform that is capable of launching a single UAV upon the platforms breaching of the water and could not be adaptable to an airborne vehicle.

Patent No. US 2009/0007765 was issued in 2009 to Hunn et al. for the Apparatus and Method for Launching a Vehicle. The invention here is described as "An apparatus for launching a vehicle includes a bag and an inflator in fluid communication with the bag, the inflator configured to generate a gas to inflate the bag. The apparatus is operable to launch the vehicle" Pg. 1, Col. 2, Abstract. The invention here details a launching mechanism whose source of force or pressure to launch the vehicle is derived from an inflatable bag. The invention here would not allow for superposed loading into a single tube and thus would have a severe limitation in the number of linearly launched vehicles able to be launched from a single apparatus.

Patent No. US 2017/0057635 issued to Strayer in 2017 for the Drone Launch Systems and Methods defining a drone launch system. The Drone launch system defined here is limited to only one drone per canister severely limiting the ability for it to perform as a drone swarm launcher and coordinator.

ILLUSTRATIONS

FIG. 3 is a top view of a saboted drone unit with the top sabot portion removed.

FIG. 4 is a top view of a kinetic energy drone with ailerons deployed.

FIG. 5 is a cross-sectional view of a kinetic energy drone.

REFERENCE NUMERALS

Figure 1:
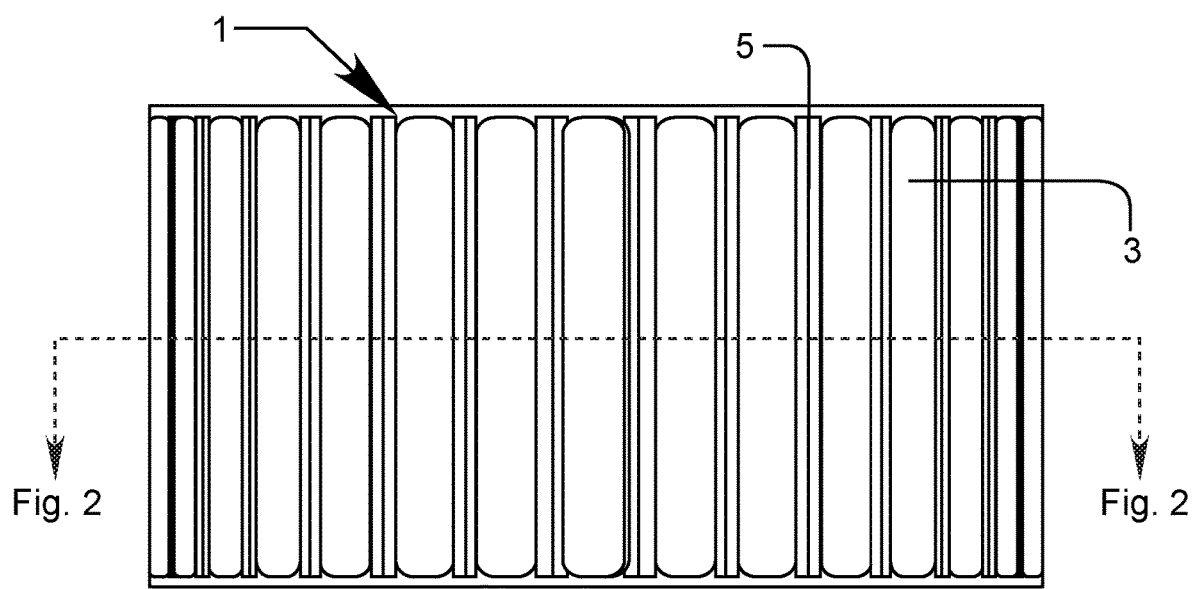
FIG. 1 is side view of the Drone Deployment Apparatus.

1. Drone deployment Apparatus
3. Saboted drone unit

5. Main drone deployment tube
6. Tube muzzle
7. Apparatus axis
8. Mid-tube
9. Apparatus inner support
10. Perimeter tube
11. Apparatus outer support
13. Kinetic energy drone
15. Upper drone sabot
16. Lower drone sabot
17. Drone sabot void
18. Fore-end guide
19. Kinetic energy penetrator
20. Power supply
21. Drone fuselage
22. Communication unit
23. CPU/Control unit
24. Rocket fuel tank
25. Drone aileron
26. Rocket motor
27. Rocket motor nozzle
28. Drone parachute
29. Saboted drone unit propellant
31. Drone ignition lead
33. Propellant igniter
35. Tube ignition lead
37. Tube bottom
41. Apparatus cluster
43. Main delivery vehicle
45. Drone swarm
47. Target vehicle Description: Drone Deployment Apparatus FIGS. 1-11

Figure 2:
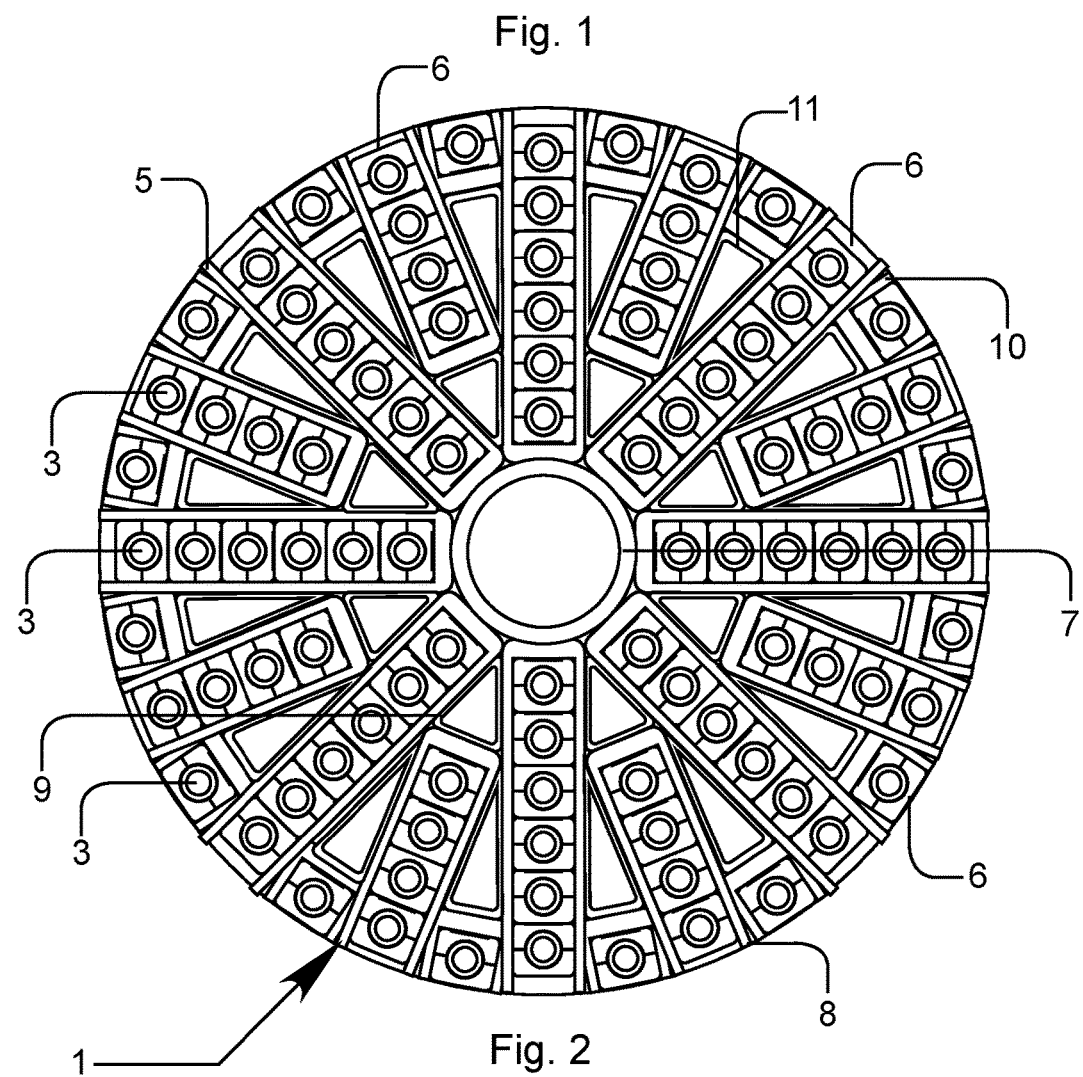
FIG. 2 is a cross-sectional view of the apparatus from FIG. 1.
Figure 6:
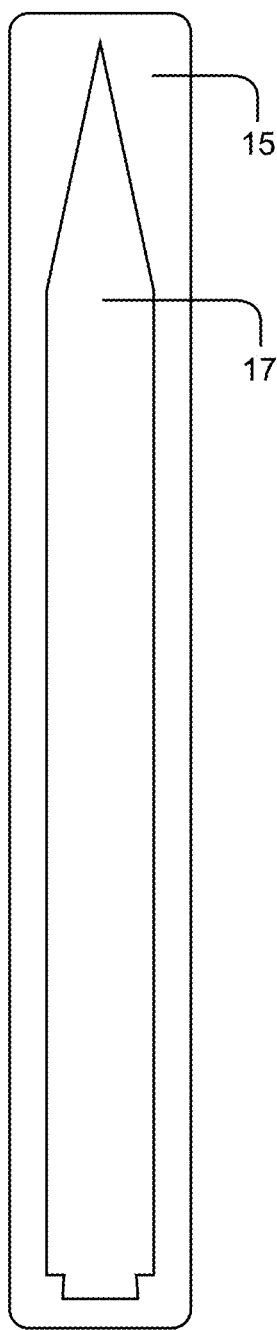
FIG. 6 is a lower view of an Upper drone sabot featuring a Drone sabot void.
Figure 7:
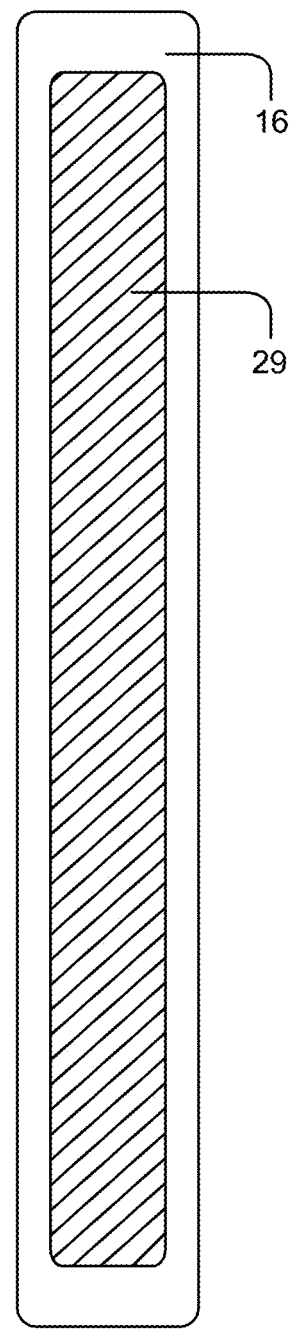
FIG. 7 is a lower view of a Lower drone sabot featuring Saboted drone unit propellant.

FIGS. 1-12 detail the Drone Deployment Apparatus 1 and the components from which it is composed of in its entirety. FIGS. 1-2 detail the complete Apparatus 1, here having s a circular configuration for the purpose to best accommodate airborne vehicles commonly circular in profile. The Apparatus 1 is composed of Drone Deployment Tubes 5 connected at Tube bottom 37 to Apparatus Axis 7 and arranged in a radial configuration with Tube muzzles 6 directed outward from the Apparatus 1. A plurality of Apparatuses 1 are connected along their Apparatus axes 7 to form an Apparatus cluster 41 which is contained and carried via Main delivery vehicle 43 such as a drone aircraft or cruise missile.

Mid-tubes 8 and Perimeter tubes 10 are between Tubes 5 and have Tube bottoms 37 connected to either Apparatus inner support 9 or Apparatus outer support 11 and extend radially with their Muzzles 6 oriented outward from the Apparatus 1. Tubes 5, 8, and 10, contain at least one Saboted drone unit 3, ready for deployment with Saboted drone unit propellant 29 oriented towards either Tube bottom 37 or an adjacent Saboted drone unit 3 as with Tubes 5 and 10.

Figure 8:
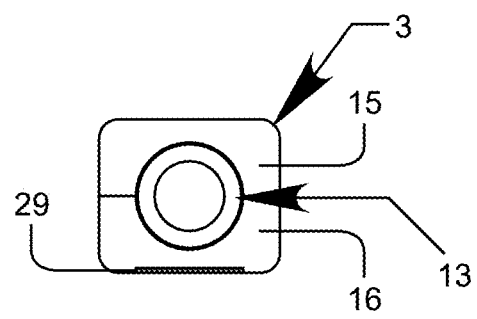
FIG. 8 is a cross-sectional view of a saboted drone from FIG. 3, including the top sabot portion.
Figure 9:
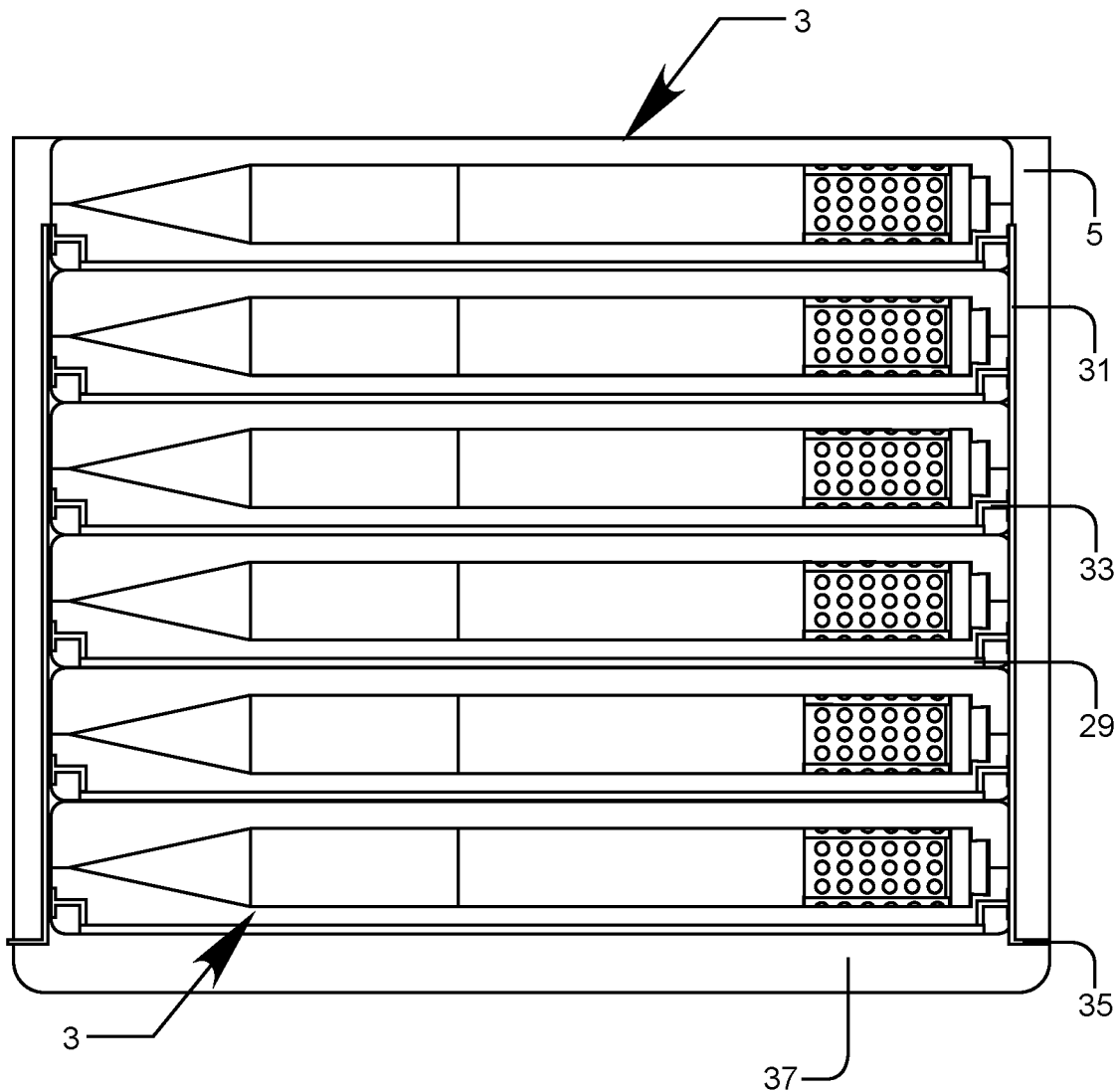
FIG. 9 is a cross-sectional view of a superposed drone deployment tube with a plurality of saboted drone units ready for deployment.
Figure 10:
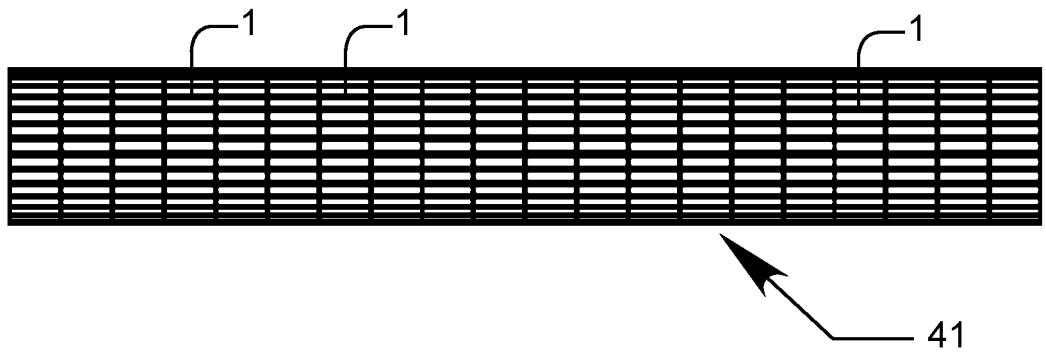
FIG. 10 is a side view of a plurality of Apparatuses connected via their central axis's to form a linear Apparatus cluster.

FIG. 8 details Tubes 5 and 8 have a Drone ignition lead 31 connecting and capable of delivering an electrical charge from Tube ignition lead 35 to an individually selected Propellant igniter 33, allowing for sequential firing of Drone units 3 from Tubes 5 and 8. Perimeter tube 10 here has one Drone unit 3 for deployment and has no necessity for sequential firing.

FIGS. 3, 6-8 detail a Saboted drone unit 3, each having a Kinetic energy drone 13 contained within Upper drone sabot 15 and Lower drone sabot 16, each sabot having a Drone sabot void 17 with an accommodating profile to receive and partially contain a Drone 13. Lower sabot 16 has Propellant ignition lead 31, Sabot ignition lead connector 33, and a Tube ignition lead connector 35, and Saboted drone unit propellant 29. Propellant 29 consisting of an ignitable explosive charge contained within a recessed portion of the Lower sabot 16, and has a directed explosive exposure towards Tube bottom 37 or a prior loaded Unit 3. Lower sabot 16 also has Propellant igniter 33 connecting and capable of delivering an electric charge from Drone ignition lead 31 component of the Tube 5, 8, and 10 to the Propellant 29.

FIGS. 3-5 detail a kinetic energy drone 13 and sabots 15 and 16. Each Kinetic energy drone 13 has at least one of the following: Fore-end guide 18, Kinetic energy penetrator 19, Power supply 20, Drone fuselage 21, Communication unit 22, CPU/Control unit 23, Rocket fuel tank 24, Drone aileron 25, Rocket motor 26, and a Rocket motor nozzle 27 and Drone parachute 28. Each Drone 13 is capable of self-sustained flight having an aerodynamic efficient profile capable of providing lift while being propelled by Rocket 26 and 27. Drone 13 is also capable of variable flight paths via Drone ailerons 25 having direct impingement on airflow over Drone 13 during flight, Ailerons 25 each are capable of having independent variable positions controlled by CPU 23. The Kinetic energy penetrator 19 portion of Drone 13 has substantial mass requiring a substantial radial force generator to influence the position of said Drone 13 lateral of its trajectory. Fore-end guide 18 has radially positioned minute explosive charges that are capable of generating a substantial force radially inward onto the Penetrator 19 to substantially affect said Drone 13 trajectory. Other means of achieving variable flight paths may also include jets, rockets, instead of or in combination with ailerons.

Kinetic energy penetrator 19 here is constructed from a material capable of performing its function as a kinetic energy weapon such as tungsten or depleted uranium. The Target vehicle such as a missile or warhead delivers the velocity required for the Penetrator 19 to perform as a kinetic energy weapon.

Communication unit 22, CPU/control unit 23, Rocket fuel tank 24, Drone aileron 25, Rocket motor 26, Rocket motor nozzle 27 and Drone parachute 28. Each Penetrating drone 13 is capable of self-sustained flight having an aerodynamic efficient profile capable of providing lift while being propelled by the Rocket motor 26 and Rocket motor nozzle 27.

Drone parachute 28 is located midway inside Drone 13 between Penetrator 19 and Fuel tank 24 and is deployable to slow the descent of Drone 13 after Target vehicle interception or termination of mission.

Figure 11:
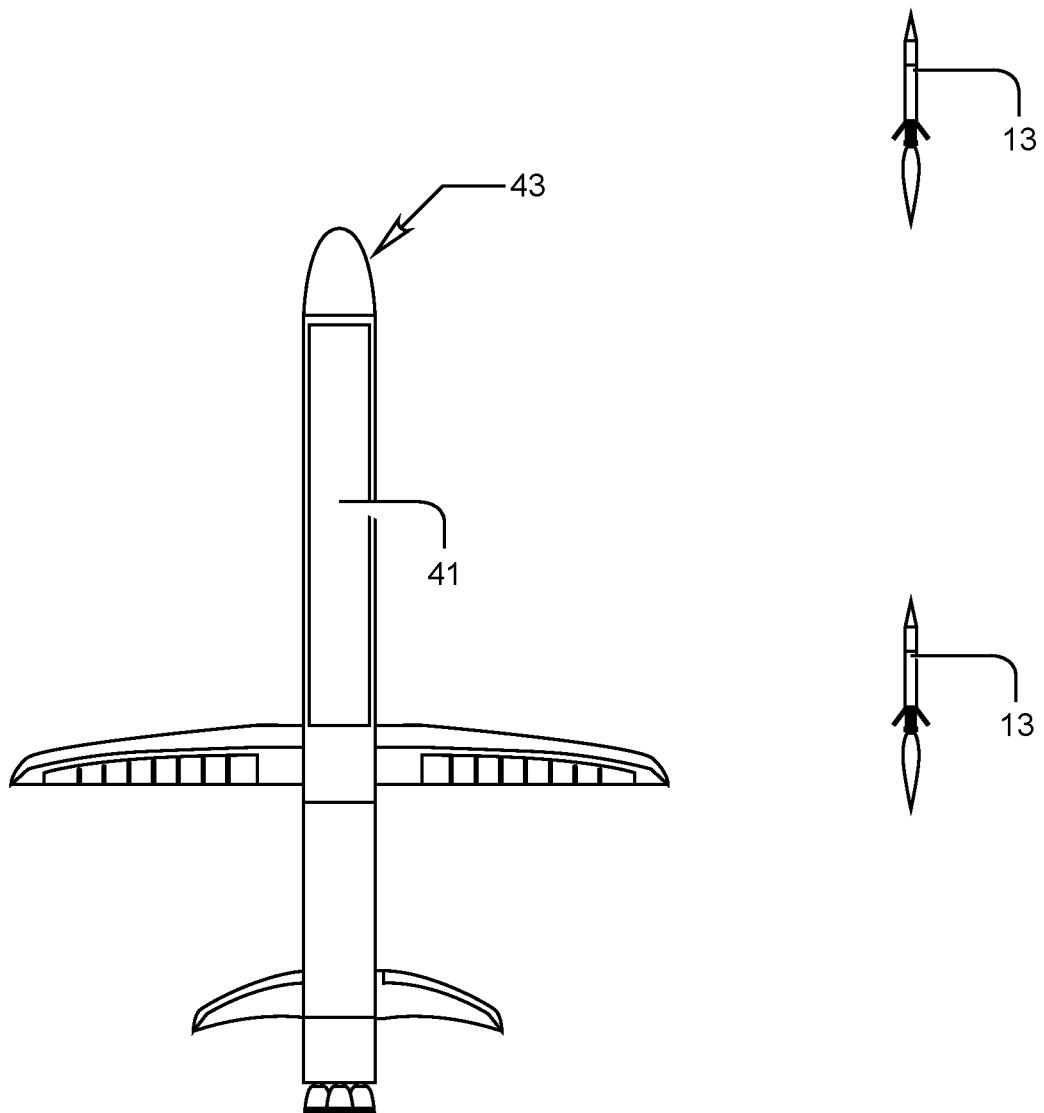
FIG. 11 is a top view of a Delivery vehicle containing an Apparatus cluster.
Figure 12:
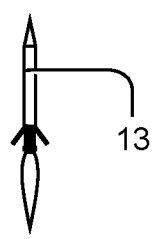
FIG. 12 is an example of a Drone swarm formation mimicking the trajectory of an incoming target vehicle.
Figure 13:
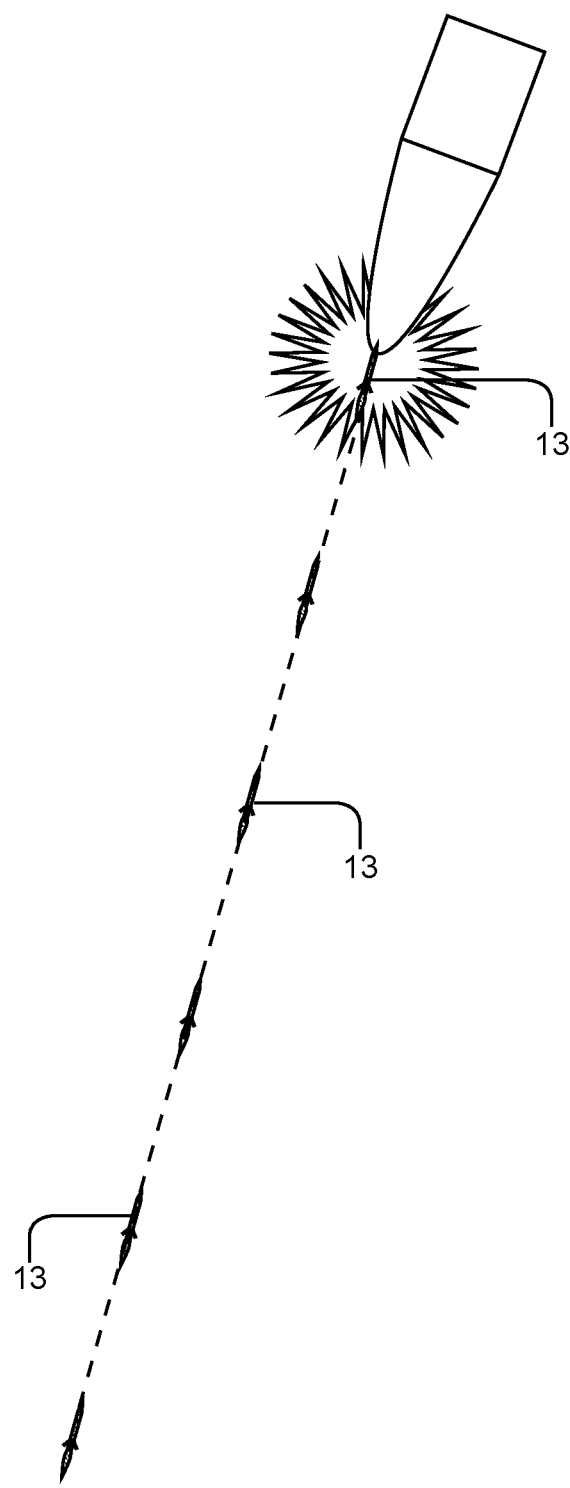
FIG. 13 is an illustration of a drone swarm intercepting a target vehicle.

FIG. 11 details Main delivery vehicle 43 containing and transporting Apparatus cluster 41. Vehicle 43 sends and receives data from external sources such as ground, air, and space based communication sources, data transferred to Vehicle 43 allows for the Vehicle 43 calculate the location and trajectory of incoming Target vehicle 47. Vehicle 43 attempts to mimic the trajectory of Target 47 while traveling in the opposite direction as the Target 47. Vehicle 43 here maintains a subsonic velocity of about 800 kph for example while in pursuit of Target 47 and is also able to quickly adjust its trajectory laterally of its forward travel. Once the Vehicle 43 is within the zone of operation of Drone swarm 45 and Apparatuses 1 of Apparatus cluster 41 deploys Drones 13 radially outward from the trajectory of Vehicle 43 where Drones 13 orient their trajectory into the trajectory of the Target 47.

Operation: Drone Deployment Apparatus FIGS. 1-11

FIGS. 1-12 detail the Drone Deployment Apparatus 1 and the components from which it is composed of in its entirety. The Apparatus 1 contains, transports, and deploys Saboted drone units 3 while Apparatus 1 is contained within Target vehicle 47. An example of the carrying capacity of Cluster 41 is having 1920 Saboted drone units 3 ready for deployment in an Apparatus cluster 41 contained in 3 meters length of Main delivery vehicle 43. When a Target vehicle 47 threat is detected the Main delivery vehicle 43 can be launched airborne in pursuit of intercepting the Target 47 by aligning its trajectory with that but in the opposite direction of the Target 47. Main delivery vehicle 43 here has a subsonic velocity of about 800 kph allowing the Main delivery vehicle 43 to have a less complicated and expensive construction and operation compared to supersonic and hypersonic airborne vehicles. Apparatus cluster 41 is transported by the Main deployment vehicle 43 into a position of effectiveness where Saboted drone units 3 would be deployed to create a Drone swarm 45.

Mid-tubes 8 and Perimeter tubes 10 are between Tubes 5, all containing at least one Saboted drone unit 3, ready for deployment with Saboted drone unit propellant 29 oriented towards either Tube bottom 37 or an adjacent Saboted drone unit 3 as with Tubes 5 and 10. When Apparatus 1 is ready to deploy Units 3 Main delivery vehicle 43 will send an electrical ignition charge to Tube ignition lead 31 connected to Propellant igniter 33 to ignite Saboted drone unit propellant 29 of selected Saboted drone unit 3. Propellant 29 subsequently burns creating an expanding volume of pressurized gas forcing Unit 3 outward from Tubes 5, 8, and 10 and radially away from Delivery vehicle 43. Rapid sequential deployment of Units 3 is capable for Tubes 5 and 8, deploying Units 3 from the outermost position and sequentially inward until Tubes 5 and 8 are exhausted.

Saboted drone units 3 each shed Upper drone sabot 15 and Lower drone sabot 16 away from and to expose Kinetic energy drone 13 into the atmosphere where Rocket motor 26 is activated to produce a thrust allowing Drone 13 autonomous flight. Kinetic energy drone 13 also has the ability to quickly change its direction laterally from its forward trajectory in order to position itself relative to the Target vehicle 47.

Drone communication unit 22 of Drone 13 sends and receives data to and from Main delivery vehicle 43, data including velocity, trajectory, and position of Drone 13 and Target vehicle 47 within Drone swarm 45. Power supply 20 provides the electrical power to operate all CPU/control unit 23 and all electrical and electro-mechanical components of Drone 13. CPU/Control unit interprets data sent from Vehicle 43 and received from Communication unit 22 into commands sent to the electrical components of Drone 13. Drone 13 is capable of varying trajectories via Drone ailerons 25 having direct impingement on airflow over Drone 13 during flight, Ailerons 25 each are capable of having independent variable positions controlled by CPU 23. Drone 13 also may have a Fore-end guide 18 having radially positioned minute explosive charges that are capable of generating a substantial force radially inward onto the Penetrator 19 to substantially affect said Drone 13 trajectory. Other means of achieving variable flight paths may also include jets, rockets, instead of or in combination with ailerons.

Rocket Motor 26, Rocket motor nozzle 27 and Rocket fuel tank 24 provide the thrust necessary for Penetrating drone 13 to achieve autonomous flight and can be either a solid or liquid fuel rocket.

Kinetic energy drones 13 position themselves in a Drone swarm 45 to align their positions into the trajectory of and ready to intercept Target vehicle 47. An example of but not limited to a Drone swarm 45 is Saboted drone units 3 to be deployed until Apparatus cluster 41 is exhausted of Units 3 for the duration of 80 seconds, or a rate of 24 per second, allowing for the formation of the Swarm 45 20,000 meters in length. The entire Swarm 45 changes its position to align itself as precisely as possible with that of the Target vehicle 47 to allow individual Drones 13 to impact the Vehicle 47.

Drones 13 are able to perform as kinetic energy weapons via the velocity provided by the Target vehicle 47 which will have a velocity of between Mach 3-7 allowing for the Drones 13 to only maintain a subsonic velocity greatly simplifying both construction and operation of the Drones 13. A single Drone 13 impact would be sufficient to disable Target vehicle 47, the kinetic energy created from the impact would be sufficient to compromise the Vehicles 47 heat shielding, armor shell, and internal components. When the Rocket motor 26 has exhausted its fuel and the Drone 13 can no longer maintain autonomous flight Drone parachute 28 deploys and allows Drone 13 to descend to earth at a sufficiently slow rate to avoid ground based collateral damage and to prevent damage to Drones 13 that have survived deployment by not intercepting Target vehicle 47.

The invention claimed is:

1. A superposed drone deployment apparatus for unmanned air vehicles comprising:
   a. a housing having an elongated cylindrical shape, the housing comprising a plurality of deployment tubes oriented in a radial configuration, each of said deployment tubes comprising a tube bottom oriented towards the central longitudinal axis of said housing and a muzzle oriented at a circumference of said housing, and
   b. a plurality of aerial drone units positioned in each of said deployment tubes forming a superposed stack of aerial drone units, each said superposed stack of aerial drone units comprising an innermost drone unit adjacent the tube bottom and an outermost drone unit adjacent the muzzle, each said aerial drone unit comprising a propellant charge capable of expelling the drone unit through said muzzle, whereby said drone units deploy radially and uniformly outward from the circumference of said housing.

2. The superposed drone deployment apparatus of claim 1 wherein each said aerial drone unit further comprises a kinetic energy penetrator segment disposed at a fore end thereof, a rocket motor and rocket motor nozzle disposed at an aft end thereof, a means for rapid trajectory deviations, and a means for exchanging data with an unmanned aerial vehicle and/or other drone units.

3. A done deployment apparatus cluster comprising a plurality of the superposed drone deployment apparatuses of claim 1, the plurality of superposed drone deployment apparatuses linearly connected such that central longitudinal axis of each drone deployment apparatus is coincident with a common axis.

\* \* \* \* \*